United States Patent [19]

Schildkraut et al.

[11] Patent Number: 5,115,336
[45] Date of Patent: May 19, 1992

[54] PHOTOREFRACTIVE SYSTEM AND PROCESS FOR ITS USE

[75] Inventors: Jay S. Schildkraut; Michael Scozzafava, both of Rochester; Dennis G. Howe, Pittsford, all of N.Y.

[73] Assignee: Eastman Kodak Company, Rochester, N.Y.

[21] Appl. No.: 569,302

[22] Filed: Aug. 20, 1990

Related U.S. Application Data

[63] Continuation-in-part of Ser. No. 491,397, Mar. 9, 1990, abandoned.

[51] Int. Cl.$^5$ .............................................. G02F 1/01
[52] U.S. Cl. .................................. 359/263; 359/245; 359/247
[58] Field of Search .................. 350/354, 355, 356; 252/582, 583, 585; 353/96.34; 365/106

[56] References Cited

U.S. PATENT DOCUMENTS

| | | | |
|---|---|---|---|
| 3,970,844 | 7/1976 | Fenn, Jr. et al. | 250/213 VT |
| 4,176,275 | 11/1979 | Korn et al. | 250/213 R |
| 4,886,339 | 12/1989 | Scozzafava et al. | 350/96.34 |
| 4,971,426 | 11/1990 | Schildkraut et al. | 350/385 |
| 4,999,809 | 3/1991 | Schildkraut et al. | 365/106 |

OTHER PUBLICATIONS

Chapter 11, Optical Phase Conjugation in Photorefractive Materials, *Optical Phase Conjugation*, Academic Press, 1983, pp. 417-425.
G. Moddel, K. M. Johnson, W. Li and R. A. Rice, "High Speed Binary Optically Addressed Spatial Light Modulator", *App.. Phys. Lett.*, vol. 55, No. 6, Aug. 7, 1989, pp. 537-539.
E. M. Yeatman and M. E. Caldwell, "Spatial Light Modulation Using Surface Plasmon Resonance", *Appl. Phys. Lett.*, vol. 55, No. 7, Aug. 14, 1989, pp. 613-615.
R. Lytel, F. G. Lipscomb, J. Thackara, J. Altman, P. Elzondo, M. Stiller and B. Sullivan, "Nonlinear and Electro-Optic Organic Devices", pp. 415-426, *Nonlinear Optical and Electroactive Polymers* (P. N. Prasad and D. R. Ulrich, editors), Plenum Press, N.Y., 1988.
D. J. Williams, "Organic Polymeric and Non-Polymeric Materials with Large Optical Nonlinearities", *Angew. Chem. Int. Ed. Engl.* 23, (1984), 690-703.
G. T. Sincerbox et al., in *Applied Optics*, vol. 20, No. 8, Apr. 15, 1981, pp 1491-1494.
J. S. Schildkraut in *Applied Optics*, vol. 27, No. 21, Nov. 1, 1988, pp. 4587-4590.

*Primary Examiner*—Rolf Hille
*Assistant Examiner*—Tan Ho
*Attorney, Agent, or Firm*—Carl O. Thomas

[57] ABSTRACT

A photorefractive system is disclosed containing interposed between electrodes an electrophotographic photoreceptor layer unit and a layer having a second order polarization susceptibility of greater than $10^{-9}$ electrostatic units comprised of organic polar aligned noncentrosymmetric molecular dipoles having an electron donor moiety linked through a conjugated $\pi$ bonding system to an electron acceptor moiety. The device can be employed to transfer information from one source of electromagnetic radiation to another.

30 Claims, 2 Drawing Sheets

PHOTOREFRACTIVE SYSTEM AND PROCESS FOR ITS USE

This application is a continuation-in-part of Ser. No. 491,397 filed Mar. 9, 1990 now abandoned.

FIELD OF THE INVENTION

The invention relates to a system for modulating electromagnetic radiation. More specifically, the invention relates to a device for modulating electromagnetic radiation in response to another source of electromagnetic radiation.

BACKGROUND OF THE INVENTION

The term "light" is employed in accordance with its accepted definition encompassing electromagnetic radiation in the ultraviolet, visible, infrared and X-radiation wavelength ranges.

With increasing interest in employing light for information transfer theoretically useful models of spatial light modulators (commonly referred to as SLM's) have been proposed.

It has been observed that light being transmitted through a medium can be modulated by spatially intersecting light from a second source when the medium exhibits a refractive index that can be varied in response to light transmission. By "spatially intersecting" it is meant that light from the separate sources traverse intersecting paths, but not necessarily within overlapping time periods. The effect, referred to as a photorefractive effect, was first observed in working with lithium niobate (LN), lithium tantalum niobate (LTN), and potassium tantalum niobate (KTN) crystals intended for second harmonic generation (SHG) applications. Observations of photorefractive effects allowing holographic images to be stored in LN and KTN are reported in Chapter 11, Optical Phase Conjugation in Photorefractive Materials, *Optical Phase Conjugation*, Academic Press, 1983, pp. 417–425.

G. Moddel, K. M. Johnson, W. Li, and R. A. Rice, "High Speed Binary Optically Addressed Spatial Light Modulator", *Appl. Phys. Lett.*, Vol. 55, No. 6, Aug. 7, 1989, pp. 537–539, illustrate a photorefractive light modulating device which employs liquid crystals as a photorefractive material. Although Moddel suggests that the ferromagnetic liquid crystals employed represent an improvement in terms of switching speeds over nematic liquid crystals, the fact is that all liquid crystal photorefractive devices are inherently limited in their frequency response, since the entire liquid crystal molecule must change its orientation to effect switching.

Another significant disadvantage of liquid crystals employed to provide photorefractive effects is that separate aligning layers must be provided above and below the liquid crystal layer to achieve the best attainable response. This involves constructing three separate layers and is consequently a fabrication disadvantage. The use of a liquid crystal layer between alignment layers is illustrated by E. M. Yeatman and M. E. Caldwell, "Spatial Light Modulation Using Surface Plasmon Resonance", *Appl. Phys. Lett.*, Vol. 55, No. 7, Aug. 14, 1989, pp. 613–615.

R. Lytel, F. G. Lipscomb, J. Thackara, J. Altman, P. Elizondo, M. Stiller and B. Sullivan, "Nonlinear and Electro-Optic Organic Devices", pp. 415–426, *Nonlinear Optical and Electroactive Polymers* (P. N. Prasad and D. R. Ulrich, editors), Plenum Press, N.Y., 1988, disclose in FIG. 1 at page 419 a spatial light modulator comprised of a photodiode for receiving modulating light, a light blocking layer, a dielectric mirror, an electro-optic crystal and a transparent electrode for external circuit connection to the photodiode. While it is speculated that organic electro-optic materials might be substituted for the electro-optic crystal, the device even when so modified remains quite complicated to construct and limited in potential configurations because of the photodiode addressing required.

D. J. Williams, "Organic Polymeric and Non-Polymeric Materials with Large Optical Nonlinearities", *Angew. Chem. Int. Ed. Eng.* 23, (1984) 690–703, illustrates the known relationships between polarization properties and organic molecular dipoles.

An electrooptic modulator based on electrically varying the efficiency of coupling a collimated monochromatic beam into surface plasmons is described in the article by G. T. Sincerbox et al in *Applied Optics*, Vol. 20, No. 8, Apr. 15, 1981, pages 1491–1494. Alternatively, an electrooptic modulator based on electrically varying the degree of coupling of a light beam to a long-range surface plasmon (LRSP) is described in the article by J. S. Schildkraut in *Applied Optics*, Vol. 27, No. 21, Nov. 1, 1988, pages 4587–4590.

Latent images stored in, for example, silver halide film or selenium xeroradiographic plates can be converted into real (human-readable) images by using known chemical or powder cloud developing processes. More particularly, the surface charges representing the latent image on xeroradiographic plates are used to attract and hold powder particles prior to their transfer to a receptor sheet and fusing. However, such conversion of an electrophotographic latent image to a real image requires physical contact between the exposed electrophotographic plate and the powder particles (or a liquid containing them) and rollers, skivving knives, etc., which eventually may degrade the plate surface.

More recently, the surface charges on electron-radiographic plates, representative of a latent radiographic image, have been read directly from the charged plate by scanning a beam of light over the charged plate and reading the representative charge emanating from the plate at the point of scan by an external electronic device. Such light scanning systems require high surface charge densities and are especially prepared (patterned or multilayer) electrophotographic plates as described above.

A typical scanning light-beam electron-radiographic arrangement is described in Fenn U.S. Pat. No. 3,970,844 wherein parallel strips of electrically conductive, optically transparent, material are disposed on a charged electrode. The parallel strips are charged and then exposed to X-rays to produce static surface charges thereon representative of the resultant latent image. The change of resistance of a photoconductor between its dark and light stages is used to store the generated charge. Additionally, the change of resistance of the photoconductor is also used to conduct the stored charge from the strip(s) to an external electronic readout device as various points on the parallel strips are subsequently scanned with the beam of light from, for example, a laser. The light beam from the laser can be used to raster-scan the individual strips with a single beam of light or concurrently linearly to scan multiple corresponding points on the parallel strips via a linear array of lightguides coupled to the laser which move across the electrode orthogonal to the linear array and parallel to the strips.

Another light-scanning electron-radiographic imaging arrangement is described in Korn et al U.S. Pat. No. 4,176,275 in which a multilayered device having a photoconductive insulating layer is utilized to provide an electrostatic charge image at a first or second conductive layer of the device in response to imaging radiation directed at the device. A scanner for scanning the device with readout radiation is used with readout electronics for converting the electrostatic charge image into electrical signals. A D.C. voltage source is used both during the imaging step to impress an electric field across the device and to provide an electric field across the device and support the charge flow to the readout electronics as initiated by the readout radiation during the readout step.

SUMMARY OF THE INVENTION

It is an object of this invention to provide a photorefractive system for modulating one source of electromagnetic radiation with another wherein the device can be highly efficient while also offering construction advantages and geometrical flexibility in form.

It is a further object to provide a photorefractive system offering the capability of reading out a static charge image on an electrophotographic plate.

In one aspect this invention is directed to a combination capable of modulating electromagnetic radiation from a first source as a function of spatially intersecting electromagnetic radiation from a second source comprising first and second spaced electrodes, first intermediate means exhibiting a variance in its refractive index as a function of a potential gradient, and second intermediate means having a conductivity that varies as a function of exposure to the electromagnetic radiation from the second source.

The combination is characterized in that the first intermediate means is a layer in contact with the first electrode having a second order polarization susceptibility of greater than $10^{-9}$ electrostatic units and is comprised of organic polar aligned noncentrosymmetric molecular dipoles each containing an electron donor moiety linked through a conjugated $\pi$ bonding system to an electron acceptor moiety, the second intermediate means is comprised of an electrophotographic photoreceptor layer unit interposed between the first intermediate means and the second electrode, and at least one of the first and second electrodes are transmissive to the electromagnetic radiation from the first source.

It is another object of this invention to provide a process of efficiently transferring information from one source of electromagnetic information to another source of electromagnetic radiation.

This object is achieved by a process of transferring information from one source of electromagnetic radiation to another comprising transferring information contained in a modulated source of electromagnetic radiation to a photorefractive imaging system and addressing the photorefractive imaging system with a source of electromagnetic radiation to be modulated in order to achieve information transfer from the modulated source of electromagnetic radiation to the source of radiation to be modulated. The process is characterized in that the photorefractive imaging system of the invention is employed.

In specific forms the objects of this invention extend to transferring information from a modulated source of X-radiation to an infrared laser beam by employing a photorefractive system of this invention specifically adapted to this purpose.

BRIEF SUMMARY OF THE DRAWING

The scale and proportions of features have been modified for ease of viewing.

DESCRIPTION OF PREFERRED EMBODIMENTS

Figure 1:
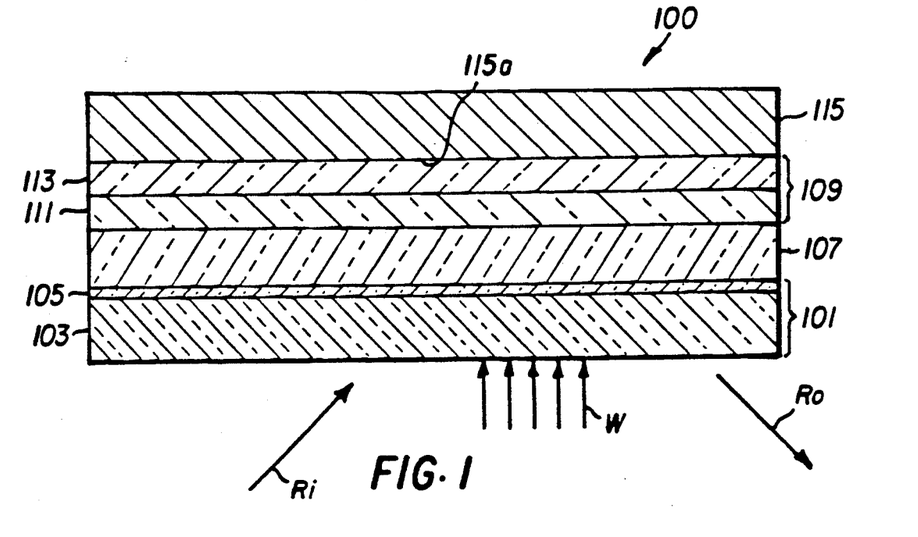
FIGS. 1 and 2 are schematic sectional views of photorefractive devices according to the invention. Layer thicknesses have been exaggerated for ease of viewing.

A photorefractive imaging system satisfying the requirements of the invention is shown in FIG. 1 in the form of photorefractive device 100. The device as shown consists of a transparent electrode 101 formed by a transparent insulative support 103 and a thin transparent electrically conductive layer 105 coated on the support. Coated on the transparent electrode is an optically active first layer 107 having a second order polarization susceptibility of greater than $10^{-9}$ electrostatic units. The first layer is rendered optically active by organic polar aligned noncentrosymmetric molecular dipoles each containing an electron donor moiety linked through a conjugated $\pi$ bonding system to an electron acceptor moiety.

Contiguously overlying the optically active first layer and in contact with it is an electro-photographic photoreceptor layer unit 109. In the preferred form shown the photoreceptor layer unit consists of a charge generating layer 111 and a contiguous overlying charge transporting layer 113. Contiguously overlying the charge transporting layer is a reflective second electrode 115.

In operation, a potential gradient is applied to the device by electrically biasing the second electrode 115 with respect to the transparent conductive layer 105 of the transparent electrode 101. With the potential gradient applied, an information bearing (i.e., writing) source of electromagnetic radiation is impinged upon the device. As shown, the image bearing source of electromagnetic radiation is an image pattern of electromagnetic radiation of a first wavelength, indicated by arrows W, which penetrates the transparent support 103, the transparent electrically conductive layer 105, and the optically active layer 107 to reach the charge generating layer 111 of the photoreceptor layer unit.

The charge generating layer absorbs the writing radiation W, creating a photocharge, a hole and electron pair, for each photon of radiation absorbed. The photocharge of one polarity, either electrons or holes, is relied upon to locally increase the conductivity of the photoreceptor layer unit. This locally shifts a higher proportion of the potential gradient separating the electrodes to the optically active layer thereby locally altering its refraction index in areas exposed to the writing radiation.

In a specifically preferred form of the invention the electrophotographic photoreceptor layer unit contains a sensitizer and charge transporting agent in the charge generating layer. The sensitizer absorbs the writing radiation while the charge transporting agent receives photocharge from the sensitizer, thereby increasing its conductivity. Since only a very small amount of the sensitizer is required, additional charge transporting agent is contained in the additional layer 113.

In an illustrative form in which charge transporting agent is a hole transporting agent, the second electrode 115 is biased negatively relative to the first electrode 101. The applied potential gradient causes mobile holes to migrate from the charge generating layer to the charge transporting layer enroute to the second electrode. Increased hole mobility in exposed areas increases the potential gradient across the optically active layer in these areas, thereby increasing the shift in its index of refraction.

At this point, it is apparent that image pattern information orginally contained in the writing radiation has been transferred into an image pattern of locally altered refractive indices within the device. This information can be transferred to a second (i.e., reading) source of electromagnetic radiation during or after device exposure to the writing source of electromagnetic radiation.

As indicated by arrow Ri a scanning beam of polarized electromagnetic radiation from a second, reading source is directed toward electrode 101 at any convenient acute angle. In a specific preferred form the scanning beam has been linearly polarized at an angle of 45° to the plane of incidence. The scanning beam penetrates the support 103, the conductive layer 105, and the optically active layer 107.

Unlike the information bearing source of writing radiation W, the electromagnetic radiation of the scanning beam is not absorbed to any significant extent within the photoreceptor layer unit. Efficient absorption of radiation W and limited absorption of radiation from the scanning beam can be realized by choosing differing wavelengths for information source W radiation and the scanning beam with a knowledge of the absorption profile of the photoreceptor layer unit as a function of wavelength. The writing radiation is generally chosen to exhibit a wavelength or broad range of wavelengths corresponding to one or more absorption peaks of the photoreceptor layer unit. When a charge transporting agent alone is relied upon both for absorption and charge transport, the absorption peak or peaks of the charge transporting agent are generally matched to the wavelengths of the writing radiation. In most instances and certainly in the most efficient arrangements, the absorption peak or peaks of a sensitizer and the wavelength of writing radiation are chosen to correspond, with the charge transporting agent absorbing little if any of the writing radiation. The scanning beam, on the other hand, is generally limited to a narrow wavelength band, preferably a single wavelength. In a specifically preferred form the scanning beam is a laser beam—i.e., coherent, single wavelength electromagnetic radiation. Solid state infrared lasers provide a particularly convenient scanning beam source. Because of the narrow band width of the scanning beam there is little difficulty in selecting an electrophotographic photoreceptor layer unit exhibiting a minimum or near minimum, absorption at the wavelength of the scanning beam.

The scanning beam traverses the layers 111 and 113 of the photoreceptor layer unit and is reflected from the surface 115a of the electrode 115. The reflected electromagnetic radiation forms a read out beam, indicated by arrow Ro, that can then be observed at any convenient external location. The read out beam is passed through a linear polarizing filter, not shown. In areas not exposed to radiation W the read out beam as viewed through the polarizing filter exhibits a different intensity than in areas exposed to radiation W. Only routine adjustment is required to relatively orient the polarizing filters intercepting the scanning beam Ri and the read out beam Ro for maximum sensitivity to variations in the writing radiation W. Either a digital or analogue read out is possible.

The photorefractive device 100 offers significant advantages in efficiency and construction. Although other (as of yet less efficient) techniques for forming the optically active layer 107 are known, a common preferred technique is to form the optically active layer by poling. In the most commonly practiced form of poling a composition containing the organic molecular dipoles is employed at a temperature sufficiently above ambient that the organic molecular dipoles are mobile within the composition. While the composition is maintained above ambient, a potential gradient is applied across the composition to cause the organic molecular dipoles to align themselves with an applied field gradient, the electron donor and acceptor moieties acting as opposite poles of each molecular dipole. By allowing the composition to cool to a temperature below that required for molecular dipole mobility with the potential gradient still applied, the organic molecular dipoles are locked in their poled orientation.

When the electrode 101 is formed of a glass support 103 and a thin transparent metal or metal oxide layer 105, the electrode 101 is ideally suited to be employed as a support and poling electrode during fabrication of the optically active layer 107. The potential gradient required for poling can be realized by creating an electrostatic charge on the surface of the composition coating used to form the optically active layer. The electrostatic charge is most commonly created by bringing the composition coating into contact with a corona discharge. Notice that the electrode 101 in this form is fully compatible with elevated temperature poling and serves the dual purpose of providing a poling electrode and an electrode of the completed device.

The electrophotographic photoreceptor layer unit 109 is formed after fabrication of the optically active layer is complete. Thus, the photoreceptor layer unit can contain any of the commonly employed organic materials, such as organic sensitizers, charge transporting agents, binders, and the like, since the these materials are not subjected to elevated poling temperatures.

Using electrode 101 as a substrate, fabrication of the device involves a sequence of steps individually well within manufacturing capabilities. For example, the optically active layer can be easily formed by spin casting and poling followed by successive vacuum vapor depositions of the charge generating layer, charge transporting layer, and the electrode 115. Note that none of these successive coating steps place any areal constraints on the device. In other words, the length and width of the photorefractive device are readily adaptable to either large or small area information transfer.

Figure 2:
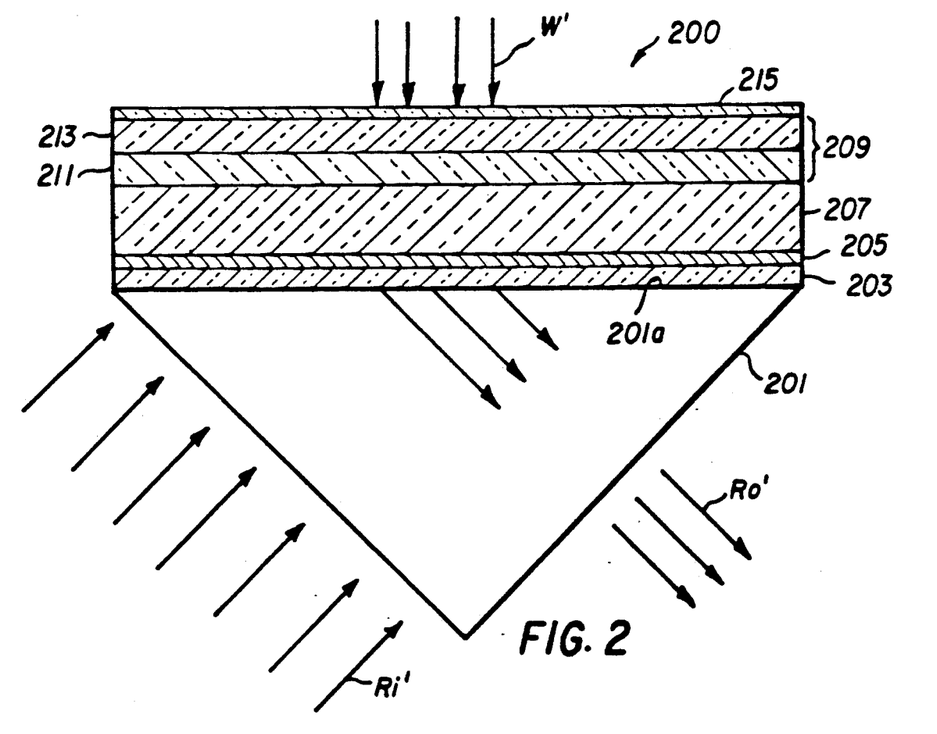

An alternative photorefractive imaging system, illustrated by reference to photorefractive device 200, presents an improvement on the photorefractive imaging system illustrated by device 100. By integrating a guided mode capability into the photorefractive device the output signal is amplified.

As shown in FIG. 2, the device 200 employs a prism 201 as a support element. Onto the base 201a of the prism is deposited a thin dielectric layer 203. The thickness of the thin dielectric layer is in the range of from 0.1 to 10 (preferably 0.3 to 5) times the wavelength of the electromagnetic radiation of input reading electromagnetic radiation Ri'.

Over the thin dielectric layer is coated a reflective metal layer 205. The reflective metal layer is sufficiently thick to be reflective, at least 50 Å (preferably at least 100 Å), yet is sufficiently thin to be penetrable by the Ri' electromagnetic radiation, no thicker than about 0.5 μm (preferably no thicker than about 300 Å).

Optically active layer 207, electrophotographic photoreceptor layer unit 209, charge generating layer 211 and charge transporting layer 213 correspond to features 107, 109, 111 and 113, respectively, previously described. Transparent electrode 215 completes the device.

In operation, a potential gradient is established between metal layer 205 and electrode 215 similarly as between conductive layer 105 and electrode 115. Information bearing modulated electromagnetic radiation from a writing source, indicated by arrows W', is supplied to the device and passes through the transparent electrode 215 and charge transporting layer 213 to be absorbed by the charge generating layer 211. This locally alters the conductivity of the electrophotographic photoreceptor layer unit and in turn alters the refractive index of the optically active layer 207.

Either during exposure to the writing radiation source or afterward and with the potential gradient still applied, linearly polarized radiation Ri' is introduced through the prism 201. Radiation Ri' penetrates the dielectric layer 203 and partially penetrates the metal layer 205. The wavelength and acute angle of incidence of radiation Ri' with the metal layer is chosen to allow guided mode transmission to a selected degree along one or both of the interfaces of the metal layer with layers 203 and 207 in areas not addressed by radiation W'. The wavelength and acute angle can be selected either to maximize or minimize transmission; however, in most instances maximum sensitivity is achieved with an intermediate guided mode transmission, usually within about 2 degrees of the maximum guided mode transmission. For simplicity of description the device is shown operating in a mode in which all but a negligible fraction of the radiation Ri' is guided along the interfaces with no significant portion of Ri' being reflected from the surface of the metal layer in areas not addressed by radiation W'.

In this circumstance, it is apparent that in areas where the radiation W' has altered the refractive index of the optically active layer a departure from conditions necessary for maximum guided mode operation exists and reflection from the metal layer is sharply increased, as indicated by arrows Ro', indicating the information bearing read out radiation. The radiation Ro' can be sensed directly, requiring no further manipulation for interpretation.

The photorefractive devices 100 and 200 are illustrations of preferred unitary photorefractive imaging systems. Many variations in photorefractive device construction and use are contemplated.

For example, referring to photorefractive device 100, it is apparent that instead of addressing the device with radiation W through the electrode 101 the device could alternatively be addressed by radiation through the second electrode when electrode 115 is capable of transmitting radiation W, while still retaining its capability of reflecting radiation Ri. When the difference in the wavelengths of Ri and W are relatively large, typically greater than about 100 nm, this can be easily accomplished. For example, in one preferred form the radiation W can be significantly higher energy (shorter wavelength) radiation than radiation Ri while a much less energetic form of electromagnetic radiation, such as a visible or infrared laser beam, can be used for read out.

It is also recognized that the photorefractive device can be modified in construction by reversing the positions of the electrodes 101 and 115. In this instance addressing with writing radiation W and read out radiation Ri still occurs through the transparent electrode 101.

In the photorefractive device 200 the dielectric layer 203 can be omitted. This reduces the degree to which reflection from the metal layer 205 can be suppressed, but a discernible image can still be obtained in the read out radiation Ro'. The prism 201 is, of course, only one simple illustration of various known types of optical coupling elements, such as gratings (e.g., a Bragg blaze grating) and the like. It is possible, but not preferred to introduce the writing radiation W' through the prism rather than the transparent layer 215. When the writing radiation W' is in a much more energetic form than the read out radiation, the writing radiation can penetrate the metal layer sufficiently to alter the conductivity of the photoconductive layer without incurring prohibitive attenuation in traversing the metal layer and its interfaces.

The guided modes produced within the device 200 can take varied forms, depending on the specific choices of materials and addressing angle. Internal propagation of surface plasmons (including long range surface plasmons) and zero, first, second and higher order guided modes are all contemplated. For the special case in which long range surface plasmons are relied upon for internal propagation, the thin dielectric layer is required and the refractive indices of the thin dielectric layer and the optically active layer in the -absence of the applied potential gradient must differ by less than 20 percent and preferably less than 10 percent. In an optimum form the refractive indices of the thin dielectric layer and the optically active layer are nearly the same, thereby facilitating the maximum sensitivity relationship for device 200 described above.

Although the electrophotographic photoreceptor layer units are described above in terms of charge generating and transporting layers, such as those commonly constructed using organic components as sensitizers, charge transporting agents and, optionally binders, it is appreciated that other forms of electrophotographic photoreceptor layer units are known in the art capable of functioning in a similar fashion. For example, a separate charge transporting layer can be omitted while retaining device utility. While organic charge generating and transporting layers are preferred for their efficiency and ease of fabrication, devices including inorganic photoconductors are contemplated. For example, the photoreceptor unit, subject to the transparency requirements of device 100, can take the form of a conventional single inorganic photoconductor layer employed in xerography.

Construction of the optically active layers have been described above in terms of the common species produced by heating above ambient temperatures to pole and allowing cooling with a potential gradient still applied to immobilize the molecular dipoles in their desired polar aligned orientation. It is, of course, possible to pole optically active layers at ambient temperatures and to rely on polymerization or crosslinking of the molecular dipole molecules or an organic binder to immobilize the molecular dipoles in their polar aligned orientation. In this instance the transparent support electrode is not subjected to higher than ambient temperatures, and a broader selection of support materials are possible.

In one specifically contemplated form of the device 100 the support 103 can take the form of a flexible polymeric film. When the thickness of the electrode 115 is limited, it is apparent that the device in this instance can be flexible, allowing different geometrical conformations to facilitate writing or read out. For example, the device could be exposed to writing radiation while held in a flat configuration and then scanned and read out while being transported over a guide roll surface. Flexibility thus allows the device to be efficiently transported from an exposure station to a read out station in a mechanical transport apparatus.

Although not shown and not required for the operation of device 100, it is recognized that a dielectric cladding layer of a type employed at a corresponding device position in optically active waveguides can be interposed between the optically active layer 107 and the transparent conductive layer 105.

Apart from the layer thicknesses specifically noted above, the thicknesses of the various layers can be varied widely while retaining device utility. In preferred embodiments of the invention the optically active layers of the devices are typically in the range of from about 0.3 to 5 $\mu$m, optimally from about 0.5 to 3 $\mu$m. When the writing radiation wavelengths are not highly energetic (i.e., in the visible or adjacent spectral regions), the charge generating layer typically ranges from about 0.1 to 2 $\mu$m in thickness, preferably from about 0.5 to 2 $\mu$m in thickness. Charge transporting layer thicknesses in the same ranges are contemplated. The transparent conductive metal and metal oxide layers are typically less than 0.5 $\mu$m in thickness with the thinnest layer compatible with having a continuous, conductive layer being feasible—e.g., thicknesses down to about 100 Å, preferably at least 200 Å.

In one specifically contemplated form of the invention the writing radiation W or W' is in a highly energetic form, such a X-radiation. The X-radiation is supplied to the device 100 or 200 as an imagewise pattern, where the pattern is produced by differential penetration of a human subject or other object to be examined. A much less energetic form of electromagnetic radiation, such as a visible or infrared laser beam, can be used for read out.

Because X-radiation is highly energetic, the photoreceptor units of the devices 100 and 200 must be selected somewhat differently than described above for visible or near-visible writing radiation. In this instance suitable electrophotographic photoreceptor units can be selected, for example, from among conventional photoreceptor units for xeroradiographic applications. For instance, a selenium layer having a thickness in the range of from 10 (preferably at least 50) to 2000 $\mu$m in thickness can be substituted for the photoreceptor units described above.

In another alternative construction, the same electrophotographic photoreceptor layer units described above can be employed, but an additional layer can be added for absorbing X-radiation and converting it into a form that can be readily absorbed by the charge generating layer. This additional layer can, for example, take the form of a phosphor layer of the type conventionally employed in X-ray intensifying screens. Roberts et al U.S. Pat. No. 4,865,944, here incorporated by reference, discloses device constructions in which suitable phosphor layers are integrated with other organic coating layers.

In still another variant form, instead of employing a phosphor layer of the type conventionally employed in X-ray intensifying screens, a phosphor layer of the type contained in storage phosphor screens can be employed. When a storage phosphor layer is employed, the X-radiation image is recorded by the storage phosphor layer. While prompt emission of radiation from the storage phosphor layer can and usually does occur to some degree, the emission primarily relied upon for altering the conductivity of the photoconductor layer is that released by subsequent stimulation.

While the devices 100 and 200 can be modified to incorporate a separate phosphor layer capable of prompt or stimulated emission, when a storage phosphor layer is employed, it is apparent that the devices can be identical to devices 100 and 200 described above with a separate storage phosphor screen that has been previously imagewise exposed to X-radiation being positioned over one of the transparent electrodes and stimulated to create a differential refractive index image in the device of the invention.

The details of storage phosphor layers and the stimulation of these layers are generally known to the art. These teachings are illustrated by Luckey U.S. Pat. No. 31,847 and by numerous improvement patents, of which the following U.S. patents are representative:

4,239,868
4,258,264
4,315,318
4,346,295
4,485,302
4,310,886
4,302,672
4,276,473
4,394,518
4,400,619
4,387,428
4,410,799
4,491,736

It is specifically contemplated to employ phosphor layers in which the indices of refraction of the phosphor particles and their binder are sufficiently matched to minimize scattering of emitted or, particularly, stimulated radiation, as taught by DeBoer et al U.S. Pat. Nos. 4,637,898 and 4,733,090, the disclosures of which are here incorporated by reference.

Instead of constructing the photorefractive imaging systems as unitary devices as shown in FIGS. 1 and 2, it is specifically contemplated to construct the imaging systems as two separate elements, an electrophotographic plate and a photorefractive readout element. Referring to FIG. 1, it can be seen that the second electrode 115 and the electrophotographic photoreceptor layer unit 109 can be constructed as a unitary element to form an electrophotographic plate while the optically active layer 107 and electrode 101 can be constructed as a second unitary element forming a readout element for the system. In the same way, the photorefractive device 200 can be formed as a two element system. The electrode 215 and photoreceptor layer unit 209 can together form a separate electrophotographic plate while the remainder of device 200 forms a readout element.

The details of construction and use of a two element photorefractive imaging system is illustrated by reference to a specifically preferred two element imaging system for transferring an image pattern of X-radiation to another light source discussed in connection with FIGS. 3, 4 and 5.

Figure 3:
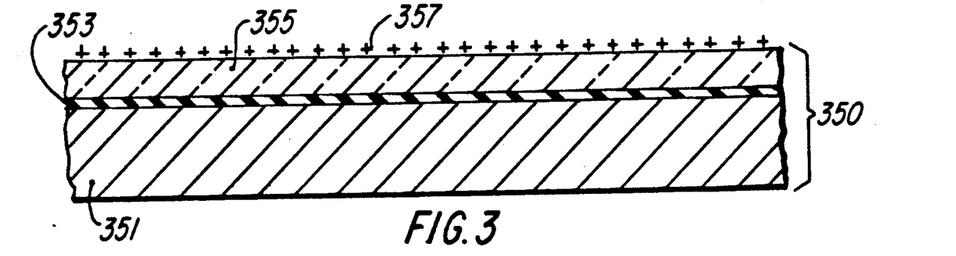
FIG. 3 is a schematic sectional view of an electrophotographic plate with a uniform surface static charge.

In FIG. 3 a xeroradiographic plate 350 is shown consisting of an electrically conductive metal support 351, a dielectric barrier layer 353, and a X-radiation responsive photoconductive layer 355 (e.g., a selenium layer). On the surface of the X-ray responsive layer is a uniform static charge, indicated as a positive charge layer 357. The function of the dielectric barrier layer is to provide an impedance capable of minimizing dissipation of the static charge by conduction to the support. Although described above in a specific form, it is appreciated that any conventional xeroradiographic plate can be substituted for plate 350.

Figure 4:
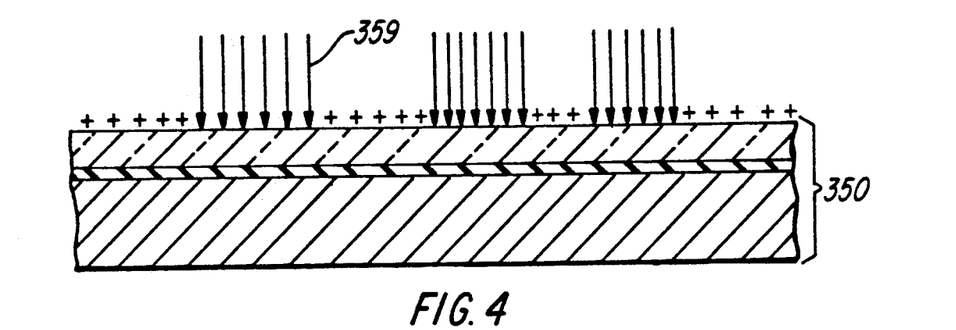
FIG. 4 is a schematic sectional view of an electrophotographic plate with a surface static charge being patterned by exposure to an image pattern of electromagnetic radiation.

As shown in FIG. 4 the electrostatically charged xeroradiographic plate is imagewise exposed to an image pattern of X-radiation, indicated schematically by arrows 359. In areas exposed to X-radiation the static charge is annihilated by photocharge (in this instance photoelectrons) liberated by absorption of X-ray photons.

Figure 5:
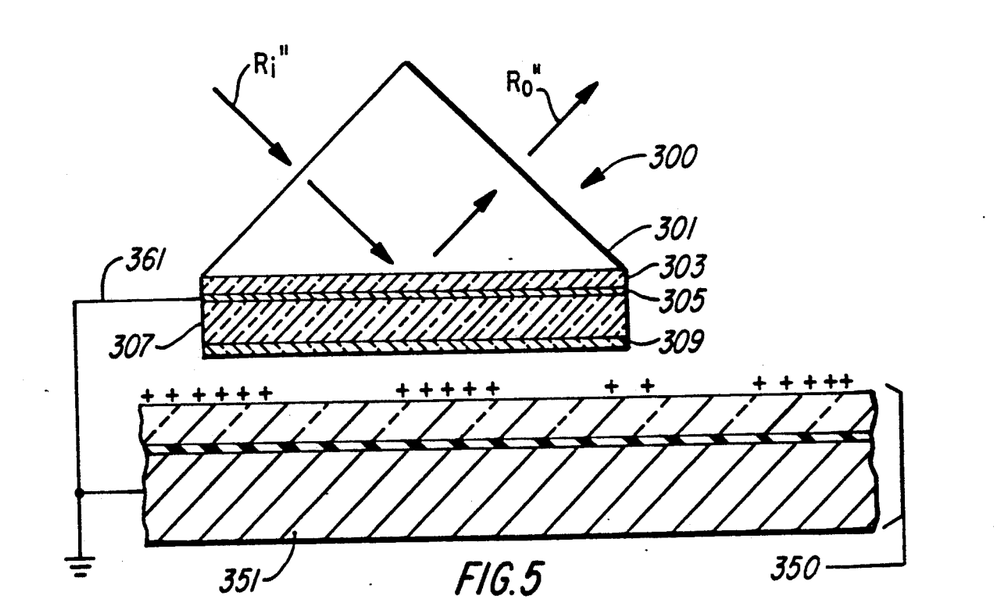
FIG. 5 is a schematic sectional view of an image pattern of static charge being scanned by a photorefractive readout element.

This leaves a static charge pattern on the xeroradiographic plate 350 as shown in FIG. 5. To transfer the information represented by the static charge pattern to another source of electromagnetic radiation a readout element 300 is provided comprised of an optical coupling element (as shown, a prism) 301, a dielectric layer 303, an electrode 305 and an optically active layer 307, which can be identical to corresponding elements 201, 203, 205 and 207 of photorefractive device 200, described above. In addition, the readout element as shown is provided with an optional dielectric protective layer 309. The function of the dielectric protective layer is to protect the optically active layer 307 from physical damage (e.g., abrasion) in use. The protective layer, if present, is chosen to have a resistance less than (preferably less than 0.1) that of the optically active layer, this being achieved by selection of the thickness and/or materials employed in forming the protective layer. The protective layer can be conveniently constructed similarly as the optical cladding layer, previously discussed.

In use, the readout element is employed to scan the surface of the xeroradiographic plate, providing a point-by-point or line-by-line reading of the static charge pattern. To accomplish this the electrode 305 of the readout element and the conductive support 351 of the xeroradiographic plate are brought to a common potential (e.g., as shown, connected to ground, as indicated schematically at 361). With the readout element positioned at a desired sensing location and in close proximity (typically within about 30 $\mu$m) of the plate, a readout input beam Ri" from a point or line source, preferably a laser beam, is directed to the optical coupling element at a selected angle similarly as described above in connection input beam Ri'. At readout points where the static charge is present the optically active layer is subject to one potential gradient and exhibits a corresponding refractive index while at points where the static charge is absent the optically active layer is subject to a different potential gradient and exhibits a differing refractive index. The output beam Ro" differs in intensity, depending on the static charge present at each readout point. By systematically scanning the surface of the xeroradiographic plate the information contained in the static charge pattern on the plate surface can be entirely transferred to the output beam Ro".

In the arrangement shown above focusing of the input beam is relied upon to define the size of the individual points (pixels) forming the image. It is also possible to define pixel diameters or scanning line widths by employing an optical coupling element that is optically opaque along its base—i.e., adjacent layer 303, except in a selected area to be addressed, such as an aperture or slit. This avoids any necessity of restricting the input beam to a point or line source. Even if a laser source is employed, any necessity of tight focusing with the resulting possibility of loss of optimum angular orientation of input beam components is thus avoided.

Another technique for restricting image readout to a selected pixel area is to provide a conductive layer containing an aperture or slit in place of the dielectric protective layer 309. The aperture or slit in the conductive layer defines boundaries within which the static charge pattern can be sensed. It is possible to employ both a conductive layer and an optically opaque optical coupling element each with an aligned aperture or slit for permitting readout.

The optically active layers contemplated are those having a second order polarization susceptibility, $\chi^{(2)}$, of greater than $10^{-9}$ electrostatic units comprised of polar aligned noncentrosymmetric organic molecular dipoles. One advantage of employing organic molecular dipoles is that the fabrication and geometrical constraints of employing optically active crystals are avoided. Another important advantage is that optically active layers containing organic molecular dipoles can be formed with low dielectric constants ($\epsilon$) of 10 or less. With a lower dielectric constant a higher voltage drop is realized within the optically active layer for a fixed amount of biasing charge—e.g., surface static charge 357. This translates directly into higher sensitivity to writing radiation patterns.

Optically active layers satisfying the requirements of this invention can be constructed by choosing organic molecular dipoles having a second order polarizability, $\beta$, greater than $10^{-30}$ electrostatic units and orienting the organic molecular dipoles in polar alignment to realize the $\chi^{(2)}$ layer requirements. Polar alignment can be realized by poling, as described above. However, other techniques for alignment, such as the construction of Langmuir-Blodgett films or self-assembled monolayers, are known to the art. Ulman et al U.S. Pat. No. 4,792,208, here incorporated by reference, describes varied polar alignment techniques.

The organic molecular dipoles each contain an electron donor moiety linked through a conjugated $\pi$ bonding system to an electron acceptor moiety to permit oscillation of the molecular dipole between a lower polarity ground state and a higher polarity excited state. Typical electron acceptor moieties include oxo, cyano, nitro, sulfonyl and sulfonimino moieties. Typical electro donor moieties include primary, secondary and tertiary amino moieties. Preferred conjugated π bonding systems are 4,4'-stilbene and 4,4'-diazostilbene linking moieties. 4-Amino-4'-(oxo, cyano, nitro or sulfonyl)stilbenes and diszostilbenes constitute specifically preferred organic molecular dipoles. Linking moieties consisting of a single carbocyclic or heterocyclic ring or extended conjugated vinyl chains are possible.

The organic molecular dipoles can be individually present as separate molecules or the organic molecular dipoles can be pendant or backbone repeating units of a polymer molecule. Ulman et al, cited above, discloses organic molecular dipoles having sulfonyl and sulfonimino electron acceptor moieties in various of the monomeric and polymeric forms described above. Scozzafava et al U.S. Pat. No. 4,886,339, here incorporated by reference, discloses the polar alignment of monomeric organic molecular dipoles within a crosslinked polymeric binder. Robello et al U.S. Pat. No. 4,796,971, here incorporated by reference, discloses organic molecular dipoles as pendant groups in crosslinked polymeric binder. Robello et al European Patent Application 0,313,477, published Apr. 31, 1989, here incorporated by reference, discloses organic molecular dipoles forming backbone repeating units in condensation polymers. D. J. Williams, cited above, provides representative illustrations of the organic molecular dipoles known prior to 1984, but many of the materials fail to satisfy $\beta$ and therefore $\chi^{(2)}$ polarization requirements.

The electrophotographic photoreceptor layer unit can in one simple form consist of a single inorganic photoconductor layer. Inorganic materials such as sulfur, selenium, tellurium, zinc oxide, zinc sulfide, cadmium selenide, zinc silicate, cadmium sulfide, arsenic triselenide, antimony trisulfide, lead oxide, and titanium dioxide, are all recognized to have electrophotographic utility.

In a preferred form, the electrophotographic photoreceptor layer unit is an organic photoconductor consisting of a charge generating layer and a charge transporting layer or multiple charge generating layers interleaved with multiple charge transporting layers. When the charge transporting agent is chosen to absorb writing radiation, the incorporation of a sensitizer in the charge generating layer can be omitted and a single charge transporting layer can be employed. In preferred constructions a separate sensitizer is present in the charge generating layer. Although it is common practice to include a polymeric binder in the charge generating and transporting layers, when the charge transporting agent in these layers is itself a polymer, no separate binder is required. In a specifically preferred form of the invention the sensitizer, charge transporting and separate binder, if present, components of the charge generating and transporting layers are all organic materials.

Organic hole transporting agents include arylamines of the type disclosed in Fox U.S. Pat. No. 3,240,597 and Klupfel et al U.S. Pat. No. 3,180,730; polyarylalkane photoconductors of the type disclosed in Noe et al U.S. Pat. No. 3,274,000, Fox U.S. Pat. No. 3,240,597, and Rule U.S. Pat. No. 3,615,402; 4-diarylamino-substituted chalcones of the type disclosed in Fox U.S. Pat. No. 3,615,402; non-ionic cycloheptenyl compounds of the type disclosed in Locker U.S. Pat. No. 3,533,786; hydrazine nucleus compounds of the type described in Fox U.S. Pat. No. 3,542,546; organic compounds having a 3,3'-bis-aryl-2-pyrazoline nucleus of the type described in Fox et al U.S. Pat. No. 3,527,602; triarylamines in which at least one of the aryl radicals is substituted by either a vinyl radical or a vinylene radical having at least one active hydrogen-containing group of the type described in Brantly et al U.S. Pat. No. 3,567,450; triarylamines in which at least one of the aryl radicals is substituted by an active hydrogen containing group of the type described in Brantly et al Belgian Patent 728,563, issued Mar. 2, 1971; organo-metallic compounds having at least one aminoaryl substituent attached to a Group IVa or Group Va metal atom of the type described in Goldman et al Canadian Patent 818,539, issued Jul. 22, 1969; and organo-metallic compounds having at least one aminoaryl substituent attached to a Group IIIa metal atom of the type described in Johnson Belgian Patent 735,334 issued Aug. 29, 1969. These and still other varied types of useful hole transporting agents are set forth in *Research Disclosure*, Vol. 109, May 1973, Item 10930. *Research Disclosure* (hereinafter RD) is published by Kenneth Mason Publications, Ltd., Dudley Annex, 21a North Street, Emsworth, Hampshire P010 7DQ, England. RD Item 10930 as well as the patents cited above in this paragraph are incorporated by reference.

Electron transporting agents of a variety of forms are also known to the art. Regensburger U.S. Pat. No. 3,928,034 teaches the use of phthalic anhydride, tetrachlorophthalic anhydride, benzil, mellitic anhydride, S-tricyanobenzene, picryl chloride, 2,4-dinitrochlorobenzene, 2,4-dinitrobromobenzene, 4-nitrobiphenyl, 4,4'-dinitrobiphenyl, 2,4,6-trinitroanisole, trichlorotrinitrobenzene, p-dinitrobenzene, chloranil, bromanil and mixtures thereof as electron transporting agents. Ong et al U.S. Pat. Nos. 4,474,865, 4,546,059, 4,562,132 and 4,609,602 disclose the utility of various strong, electron withdrawing group di-substituted 9-fluorenylidenemethanes, 10-anthronylidenemethanes and 12,12-bisanthraquino-diamethanes as electron transporting agents. Scozzafava et al U.S. Pat. No. 4,514,481 discloses 4H-thiopyran-1,1-dioxide having an electron withdrawing group at the 4 position to be useful electron transporting agents. Japanese Kokai 63/173,388 and 63/174,993 (priority 13/01/87) disclose dicyano derivatives of benzophenones that are 4-dimesitylboron substituted to be useful electron transferring agents. Kung et al U.S. Pat. Nos. 4,869,984 and '985 disclose novel naphthoquinone -derivatives in which one or both of the oxo groups are replaced with an imino nitrogen that is in turn substituted with a strong electron withdrawing group, such as a cyano group, to the useful electron transporting agents. The disclosures of each of these teachings are here incorporated by reference.

Sensitizing compounds useful with the charge transporting agents can be selected from a wide variety of materials, including such materials as pyrylium dye salts (including thiapyrylium, selenapyrylium and tellurapyrylium analogues) disclosed in Van Allan et al U.S. Pat. No. 3,250,615; fluorenes, such as 7,12-dioxo-13-dibenzo(a,h)fluorene, 5,10-dioxo-4a,11-diazobenzo(b)-fluorene, 3,13-dioxo-7-oxadibenzo(b,g)fluorene, and the like; aromatic nitro compounds of the kinds described in Minsk et al U.S. Pat. No. 2,610,120; anthrones of the type disclosed in Zyanut U.S. Pat. No. 2,670,284; quinones of the type disclosed in Minsk et al U.S. Pat. No. 2,670,287; thiazoles of the type disclosed in Robertson et al U.S. Pat. No. 2,732,301; mineral acids; carboxylic acids, such as maleic acid, dichloroacetic acid, trichloroacetic acid and salicylic acid; sulfonic and phosphoric acids; and various dyes, such as cyanine (including carbo- and dicarbo-cyanines), merocyanine, diarylmethane, thiazine, azine, oxazine, xanthene, phthalein, acridine, azo, anthraquinone and similar dyes. Illustrative sensitizers and sensitizer combinations are disclosed in the various patents and publications cited above to illustrate charge transporting agents. Preferred sensitizers are 1,4,5,8-naphthalene dicarboximides, such as those disclosed by Chen et al U.S. Pat. No. 4,442,193, and their binaphthalene analogues (3,4,9,10-perylene dicarboximides), particularly N,N'-diphenyl substituted dicarboximides of naphthalene and perylene which are further substituted with solubility modifying substituents, such as alkyl and alkoxy phenyl ring substituents of from 1 to 6 carbon atoms. Any conventional sensitizer concentration of sensitizer known to be useful in charge generating layers can be employed. Very low molar concentrations, in the range of from 1 to 100 ppm, are preferred, but almost any sensitizer concentration ranging up to 50% or more can tolerated.

A wide variety of conventional common nonionic vinyl and condensation polymeric binders are useful in the charge generating and transporting layers. A catalog of useful, early recognized binders is provided by Desauer and Clark, *Xerography and Related Processes*, Focal Press Ltd., 1965, at page 165, here incorporated by reference. Preferred binders are film forming polymers that are electrically insulating and exhibit sufficient dielectric strength to withstand applied potential gradients. Such binders include, for example, styrene-butadiene copolymers; vinyl toluene-styrene copolymers; styrene-alkyd resins; silicone-alkyl resins; soya-alkyd resins; vinylidene chloride-vinyl chloride copolymers; poly(vinylidene chloride); vinylidene chloride-acrylonitrile copolymers; vinyl acetate-vinyl chloride copolymers; poly(vinylacetals), such as poly(vinyl butyral); nitrated polystyrene; poly(methylstyrene); isobutylene polymers; polyesters, such as poly[ethylene-co-alkylenebis(alkyleneoxyaryl)-phenylene dicarboxylate]; phenolformaldehyde resins; ketone resins; polyamides; polycarbonates; polythiocarbonates; poly[ethylene-co-isopropylidene-2,2-bis-(ethyleneoxyphenylene)terephthalate]; copolymers of vinyl haloacrylates and vinyl acetate such as pol(vinyl-m-bromobenzoate-co-vinyl acetate); chlorinated poly(olefins), such as chlorinated poly(ethylene); and polyimides, such as poly[1,1,3-trimethyl-3-(4'-phenyl)-5-indane pyromellitimide].

Binder polymers are preferred which provide little or no interference with the generation or transport of charge. Examples of binder polymers which are especially useful include bisphenol A polycarbonates and polyesters such as poly[4,4'-(2-norbornylidene)diphenylene terephthalate-co-azelate].

The transparent conductive metal and metal oxide layers can be formed by conventional procedures. A convenient electrode support 101 is commercially available as Nesatron ™ glass, a glass support coated with a transparent coating of indium tin oxide. The reflective metal layers 115, 205 and 215 are preferably formed of a metal having at least a moderate work function (at least 3.5 electron volts) and most preferably a high work function (at least 4.5 eV). When the reflective metal layers have a work function of at least 4.5 eV, they are sufficiently noble to withstand oxidation at elevated poling temperatures. Illustrative of contemplated metals having a work function of at least 4.5 eV are tungsten, rhenium, osmium, iridium, platinum and gold. Of these metals, gold is a particularly preferred metal.

The various optically passive transparent dielectric layers referred to above (e.g., the cladding layers, dielectric layer 203, and protective layer 309) can in one preferred form the first dielectric layer can be a metal oxide or fluoride layer. Since oxygen and fluorine generally form relatively inert stable compounds with metals, it is apparent that the protective layer can be formed from a broad selection of metal fluorides and oxides. Alkaline earth oxides (particularly magnesia), rare earth oxides, alumina, and silica constitute preferred metal oxides for use in the practice of this invention. However, any stable metal oxide that can be readily deposited in an amorphous form can be employed. Alkali metal fluorides (e.g., lithium fluoride) and alkaline earth metal fluorides (e.g., calcium or magnesium fluoride) constitute preferred metal fluorides. Rare earth fluorides are also contemplated. Mixed metal oxides, mixed metal fluorides, and mixtures of metal fluorides and oxides are all contemplated. Mixtures offer the advantage of increasing steric disorder, thereby suppressing crystallization and preserving the desired amorphous nature of the coating.

Any conventional technique for depositing the metal fluoride or oxide layer compatible with the metal surface onto which deposition is intended can be undertaken. Vacuum vapor deposition, sputtering, chemical vapor deposition, molecular beam epitaxy, liquid phase epitaxy, electrolytic oxidative coating, and similar conventional coating processes can be employed.

It is specifically contemplated to form metal fluoride coatings by the thermal decomposition of a metal carboxylate (e.g., a metal acetate or 2-ethylhexanoate) in the presence of fluorinating agent (e.g., heptafluorobutyric acid). This method is the subject matter of Paz-Pujalt U.S. Ser. No. 377,646, filed Jul. 10, 1989, titled METHOD OF FORMING METAL FLUORIDE FILMS BY THE DECOMPOSITION OF METALLO-ORGANIC FILMS IN THE PRESENCE OF A FLUORINATING AGENT, commonly assigned.

Instead of forming an optically passive dielectric layer of a metal oxide or fluoride, in an alternative preferred form of the invention one or more of these layers are formed of one or more amorphous low molecular -weight aromatic compounds.

By "amorphous" it is meant that there is substantially no crystallinity in the layer or microstructure attributed to the coating process. This can be determined by visual inspection under a microscope; by Raman spectroscopic techniques; or by the observation of scattered light from the waveguide or device.

The term "low molecular weight" is employed to designate those aromatic compounds having a molecular weight below about 1000. In other words, film forming polymers, which typically have a molecular weight of at least 5000, are excluded.

Low molecular weight aromatic compounds whose vapor pressure is sufficiently high so that the compound can be vacuum deposited are preferred.

Low molecular weight aromatic compounds are useful in the present invention are solids at room temperature. They preferably have a glass transition temperature of greater than about 50° C. Glass transition temperature is measured using conventional techniques, such as differential scanning calorimetry. The measurement should be taken from amorphous bulk material that is substantially free from residual solvents and decomposition products since that is the condition of the materials when they are vacuum coated.

The low molecular weight aromatic compounds contain at least one aromatic carbocyclic or heterocyclic ring. In a preferred form the compounds can be the "multicyclic aromatic nucleus" compounds described in U.S. Pat. No. 4,499,165 or derivatives thereof.

A "multicyclic aromatic nucleus" is a nucleus comprising at least two cyclic groups one of which is aromatic, including aromatic heterocyclic ring groups. The cyclic group may be substituted with substituents such as aliphatic hydrocarbons, including cycloaliphatic hydrocarbons, other aromatic ring groups such as aryl, and heterocyclic ring groups such as substituted or fused thiazole oxazole, imide, pyrazole, triazole, oxadiazole, pyridine, pyrimidine, pyrazine, triazine, tetrazine and quinoline groups. The substituents are fused or non-fused and mono or polycyclic. Examples of multicyclic aromatic nuclei include 9,9-bis(4-hydroxy-3,5-dichlorophenyl)fluorene, 4,4'-hexahydro-4,7-methanoindan-5-ylidenebis(2,6-dichlorophenol); 9,9-bis(4-hydroxy-3,5-dibromophenyl)fluorene, 4,4'-hexahydro-4,7-methanoindan-5-ylidenebis(2,6-dichlorophenol); 3',3'',5',5''-tetrabromophenolphthalein, 9,9-bis(4-aminophenyl)fluorene, phenylindandiols; 1,1'-spirobiindandiols, 1,1'-spirobiindandiamines, 2,2'-spirobichromans; 7,7-dimethyl-7H-dibenzo[c,h]xanthenediol; 9,9-dimethylxanthene-3,6-bis(oxyacetic acids); 4,4'-(3-phenyl-1-indanylidene)diphenol and other bisphenols; 9-phenyl-3-oxo-2,6,7-trihydroxyxanthene; and the like.

Useful multicyclic aromatic nuclei compounds are:

A. The phenylindan diols disclosed in *Research Disclosure*, Item No. 11833, February 1974, and U.S. Pat. Nos. 3,803,096, 3,859,364 and 3,886,124 and the phenylindan diamines of U.S. Pat. Nos. 3,897,253 and 3,915,939.

B. The 1,1'-spirobiindan diols and diamines disclosed in U.S. Pat. No. 3,725,070; and the 1,1'-spirobiindan (dicarboxylic acids) of *Research Disclosure*, Item No. 9830, June 1972 (anonymous), C. The 1,1'-spirobiindan-5,5'-diamines disclosed in *Research Disclosure*, Item No. 13117, March 1975, D. The 2,2'-spirobichromans disclosed in U.S. Pat. No. 3,859,097, E. The 7,7-dimethyl-7H-dibenzo[c,h]xanthene diols disclosed in U.S. Pat. Nos. 3,859,254 and 3,902,904, F. The 9,9-dimethylxanthene-3,6-bis(oxyacetic acids) disclosed in *Research Disclosure*, Item No. 9830, June 1972 (anonymous), G. The 4,4'-(3-phenyl-1-indanylidene)diphenols disclosed in *Research Disclosure*, Item No. 13101, March 1975, H. The 4,4'-(hexahydro-4,7-methanoindan-5-ylidene)diphenols disclosed in *Research Disclosure*, Item No. 13568, July 1975, I. The bisphenols disclosed in *Research Disclosure*, Item No. 13569, July 1975,

J. The sulfonyldibenzoic acids disclosed in *Research Disclosure*, Item No. 14016, December 1975, K. The polycyclic norbornanes of *Research Disclosure*, Item No. 9207, December 1971, and L. The 1,2,3,4-tetrahydronaphthalenes disclosed in *Research Disclosure*, Item No. 13570, July 1975.

In some instances, the multicyclic aromatic nucleus compound itself will not have the desired glass transition temperature. In that case, derivatives of these compounds are useful. The compounds described above are bifunctional and can therefore be reacted with reactive compounds to form side chains on the nucleus. Preferred side chain groups are aliphatic groups and aromatic groups which can include substituents such as halogen, cyano or alkoxy; and hetero atom containing groups. These groups are described more completely below in relation to preferred compounds. Preferred compounds are substituted phenylindan compounds and phthalimide compounds described below.

The phenylindan compounds have the structure:

wherein R and $R^1$ are independently selected from the group consisting of nitro, amino, carboxyl, formamido groups, carbamoyl groups and heterocyclic groups derived from amino or carboxyl groups.

Useful formamido and carbamoyl groups are represented by the formulae $-NHCOR^2$ and $-CONR^2R^3$ respectively, wherein $R^2$ and $R^3$ are independently selected from the group consisting of unsubstituted and substituted aliphatic, aromatic and heterocyclic groups such that the molecular weight of the compound is less than about 1000.

Useful aliphatic groups include alkenes such as ethyl, propyl and nonyl; branched aliphatic groups such as 2,2-dimethyl propyl; cycloaliphatic such as cyclohexyl; substituted aliphatic such as aliphatic substituted with halogen, alkoxy, cyano and aromatic groups such as perfluoropropyl, 2-methoxyethyl and phenyl methyl; and unsaturated aliphatic groups such as 2-propenyl and 1-cyclohexenyl.

Useful aromatic groups include phenyl and naphthyl and substituted aromatic such as aromatic substituted with halogen, alkyl, cyano, alkoxy and hydroxy such as 4-methoxy phenyl and 3,4-dichloro phenyl.

Useful heterocyclic groups include pyridyl, furanyl, thiophenyl, quinolyl and piperidyl; and substituted heterocyclic such as heterocyclic substituted with alkyl, halogen and alkoxy such as 5-butylpyridyl.

Heterocyclic groups derived from amino or carboxyl groups are those groups that can be formed by reacting the amino or carboxyl group with another reagent to form the heterocycle. Useful groups therefore include the following, which can be substituted, for example, with aliphatic groups; halogen; alkoxy and nitro:

-continued and

The formamido compounds are made from the starting diamine phenylindan by reaction with the acid chloride corresponding to the desired R group. The acid chloride is made from the corresponding acid by reaction with thionyl chloride. The reaction can take place in a suitable solvent such as a combination of triethylamine in dichloromethane.

The similar carbamoyl compounds are made in a similar manner starting from the phenylindandicarboxylic acid, converting it to the corresponding acid chloride and reacting the acid chloride with the desired amine.

Where R and $R^1$ are different, mixtures of the side chain precursors are used and the compound isolated by liquid chromotography. In preferred embodiments, there is no need to resolve the mixture as it is useful directly.

Exemplary preferred phenylindan compounds are listed in Table I. All of the refractive indices reported in this table and subsequently were measured at 632 nm.

TABLE I

| Compound | R | Refractive Index | Tg °C. |
|---|---|---|---|
| TEL-1 | —CONH$_2$ | 1.613 | 110 |
| TEL-2 | —NHCO—(C$_6$H$_4$)—OCH$_3$ | 1.630 | 114 |
| TEL-3 | —NHCO—(C$_6$H$_4$)—Cl | 1.629 | 118 |
| TEL-4 | —NHCO—(C$_6$H$_4$)—Br | 1.647 | 134 |

TABLE I-continued

| Compound | R | Refractive Index | Tg °C. |
|---|---|---|---|
| TEL-5 | —NHCO—(C$_6$H$_4$)—CN | 1.677 | 138 |
| TEL-6 | —NHCO—(C$_6$H$_5$) | 1.634 | 114 |
| TEL-7 | —NHCO—(C$_6$H$_3$)Cl$_2$ | 1.649 | 127 |
| TEL-8 | —NHCO—(C$_6$)F$_5$ | 1.548 | 123 |
| TEL-9 | —NHCO—naphthyl | 1.656 | 133 |
| TEL-10 | —CONH—(C$_6$H$_4$)—Br | 1.659 | 136 |
| TEL-11 | —NHCO—(C$_6$H$_{11}$) | 1.569 | 150 |
| TEL-12 | —NHCOCH$_2$C(CH$_3$)$_3$ | 1.537 | 112 |
| TEL-13 | —NHCOCH$_2$CH$_2$CH$_3$ | 1.572 | 78 |
| TEL-14 | —NHCOCF$_2$CF$_2$CF$_3$ | 1.472 | 60 |
| TEL-15 | —CON—(C$_6$H$_{11}$)$_2$ | 1.548 | 99 |
| TEL-16 | —CONHC(CH$_3$)(CH$_3$)CH$_2$CH$_3$ | 1.545 | 86 |

TABLE I-continued

| Compound | R | Refractive Index | Tg °C. |
|---|---|---|---|
| TEL-17 | −N(C(=O))₂-C₆H₃-CH₃ (phthalimide with methyl) | 1.660 | 128 |
| TEL-18 | Mixture of —NHCO-C₆H₄-Br, —NHCO-naphthyl, and —NHCO-C₆H₄-OCH₃ | 1.654 | 121 |

Preferred phthalimide compounds are disclosed by Machiele et al U.S. Pat. No. 4,948,216, the disclosure of which is here incorporated by reference. The phthalimide compounds have the structure:

wherein R and R¹ are as defined above.

The symmetrically substituted compounds, that is R=R¹, are made starting with nitro phthalic anhydride. This is reacted with a nitroaniline to give a dinitro-N-phenyl-phthalimide. This in turn is reduced to the corresponding diamino compound which is then reacted with the oxychloride of the desired side chain.

The similar unsymmetrical compounds are made by reacting the appropriately substituted aniline with the proper nitro-phthalic anhydride followed by reduction to the corresponding amine. The amine is then reacted with the desired acid chloride.

Exemplary phthalimides are listed in Table II.

TABLE II

| Compound | Structure | Data |
|---|---|---|
| TEL-19 | Br-C₆H₄-CONH-[phthalimide]-N-C₆H₄-NHCO-C₆H₄-Br | Index: 1.703 (second sample index = 1.705) mp: >240° |
| TEL-20 | Br-C₆H₄-CONH-[phthalimide]-N-C₆H₄-NHCO-C₆H₄-Br | Index: 1.776 mp: >240° |

TABLE II-continued

| | | |
|---|---|---|
| TEL-21 | [structure: 2,3-disubstituted benzene with (CH₃)₃CCH₂CONH- and acetyl groups, linked via N to phenyl-NHCOCH₂C(CH₃)₃] | Index: 1.578<br>mp: 197–200° |
| TEL-22 | [structure: naphthalene-CONH-phenyl(diacetyl)-N-phenyl-NHCO-naphthalene] | Index: 1.670<br>mp: >240° |
| TEL-23 | [structure: 3,4-dichlorophenyl-CONH-phenyl(diacetyl)-N-phenyl-NHCO-3,4-dichlorophenyl] | Index: 1.737<br>mp: >240° |
| TEL-24 | [structure: naphthalene-CONH-phenyl(diacetyl)-N-phenyl-NHCO-naphthalene]<br>+<br>[structure: 3,4-dichlorophenyl-CONH-indandione-phenyl-NHCO-3,4-dichlorophenyl] | Index: 1.744<br>(50:50 mixture co-evaporated from sources) |
| TEL-25 | [structure: 4-bromophenyl-CONH-phenyl(diacetyl)-N-phenyl-NHCO-naphthalene] | Index: 1.739<br>mp: 214–222° |

TABLE II-continued

| | | |
|---|---|---|
| TEL-26 |  | Index: 1.751<br>mp: 231–235° |
| TEL-27 |  | Index: 1.704<br>mp: 255–259° |
| TEL-28 |  | mp: >260° |
| TEL-29 |  | |

Still other exemplary low molecular weight aromatic compounds useful as transmission enhancement layers in the practice of this invention are listed in Table III.

TABLE III

| Compound | R | Refractive Index |
|---|---|---|
| TEL-30, -31, -32 -phenyl-NHR) | —COCH$_2$C(CH$_3$)$_4$<br>—H<br>—CO—C$_6$H$_4$—Br | 1.599<br>1.701<br>1.708 |

TABLE III-continued

| Compound | | R | Refractive Index |
|---|---|---|---|
| TEL-33, -34 | [structure: tetrabromo bis-phenol with RO groups and fused ring] | —COCH$_2$C(CH$_3$)$_3$<br>—OH | 1.572<br>1.659 |
| TEL-35, -36, -37 | [structure: bis(dimethyl) bridged biphenyl with RO groups] | —COCH$_2$C(CH$_3$)$_4$<br>—H<br>—CO—C$_6$H$_4$—Br | 1.514<br>1.575<br>1.610 |
| TEL-38, -39, -40 | [structure: diamide with RNH and NHR groups] | —COCH$_2$C(CH$_3$)$_4$<br>—H<br>—CO—C$_6$H$_4$—Br | 1.578<br>1.755<br>1.731 |

Vacuum vapor deposition of the low molecular weight aromatic compounds can be achieved using any convenient conventional vacuum apparatus. A typical vacuum coating apparatus will include a vacuum chamber which is connected to a mechanical vacuum pump which typically provides a pressure as low as about $10^{-3}$ mm Hg. In addition, a diffusion pump is provided to reduce the vacuum further, typically down to about $10^{-6}$ mm Hg. Inside the chamber, there is provided an evaporation source for the material. The container is typically covered, the cover having an opening to direct the flow of material. The substrate to be coated is usually above the container. The uniformity of the coating can be improved by increasing the distance between container and the support.

Metal oxides, metal fluorides, and mixtures of these inorganic materials, hereinafter also referred to as category (a) materials, are preferably used alone for forming first dielectric layers of less than 0.1 μm. When it is preferred to form the first dielectric layer of a thickness greater than about 0.2 μm, it is preferred to employ one or a combination of low molecular weight aromatic compounds, hereinafter referred to as category (b) materials. Category (a) materials are more stable and more resistant to solvents than category (b) materials, but have the disadvantage that they do not conveniently form smooth, uniform layers within the highest thickness ranges of the first dielectric layer contemplated by the invention. Category (b) materials readily form smooth thicker layers, but with the disadvantages indicated. By employing category (a) and (b) materials in combination it is possible to realize both the greater layer thickness capabilities of category (b) materials and the enhanced stabilities of category (a) materials. It is preferred to employ category (a) and (b) materials in combination in weight ratios of (a):(b) of from 20:80 to 90:10 (preferably 50:50 to 80:20). Blends of category (a) and (b) materials can be readily obtained by concurrent vacuum vapor deposition.

Schildkraut et al U.S. Ser. No. 419,817, filed Oct. 11, 1989, allowed and here incorporated by reference, discloses specific materials and layer arrangements particularly suited for use in the practice of the invention. When the dielectric layer 203 is omitted, somewhat lower levels of modulation are achieved, but a device that is still useful in the practice of this invention results. Rider et al U.S. Ser. No. 419,984, filed Oct. 11, 1989, -allowed and here incorporated by reference, discloses specific materials and layer arrangements particularly suited for the practice of the invention in this form.

While the optical coupling elements have been illustrated by depicting prisms 201 and 301, it is appreciated that prisms, though efficient couplers, are relatively bulky items. An efficient and more compact alternative coupling element is a Bragg type coupler, such as a Bragg blaze grating. The prisms can, if desired, by replaced with Bragg type couplers of the type disclosed in Kogelnik U.S. Pat. No. 3,674,336. Kogelnik discloses formation of these couplers using dichromated gelatin. Instead of employing dichromated gelatin, the coupling grating can be formed in a silver halide emulsion layer. For example, the technique disclosed by Gilbreath-Fransen et al U.S. Pat. No. 4,878,718 for forming holograms in silver halide emulsion layers can be employed. While the invention has been described in terms of relatively simple fixed optical coupling arrangements, it is appreciated that light coupling arrangements that can be modulated are possible. For example, Kenan et al U.S. Pat. No. 4,006,967 discloses a Bragg type coupler which can be electrically controlled.

SPECIFIC EMBODIMENT

The following specific illustration of the invention is provided. All percentages, unless otherwise stated percentages by weight, based on total weight.

A linear acrylate polymer containing 4-dialkylamino-4'-methylsulfonylstilbene molecular dipoles as pendant ester groups of the type exemplified by Ulman et al U.S. Pat. No. 4,792,208 was chosen having a molecular hyperpolarizability ($\beta$) of $57.7 \times 10^{-30}$ for second harmonic generation with a 1.907 $\mu$m fundamental beam, a ground state dipole moment of 9.94 Debye, and an absorption maximum of 386 nm. The polymer was dissolved in 1,2,3-trichloropropane to prepare a 13 percent solution. The solution was spin coated onto a transparent indium tin oxide layer of soda lime glass. The solution was spun at 500 rpm for 10 sec followed by 2000 rpm for 60 sec. The resultant film was about 1 $\mu$m in thickness. The film was baked in a vacuum oven at 110° C. and 25 m torr overnight.

The film was converted into an optically active layer by poling as follows: The film surface was corona charged to about 200 volts with the indium tin oxide conductive layer grounded while the film was heated to 99° C. After an hour the film was cooled to room temperature and the corona charging was then discontinued.

On top of the optically active layer was formed a photoconductor layer 0.5 $\mu$m in thickness by co-evaporating a 1:1 weight ratio of N,N'-bis(2,5-di-tert-butylphenyl)-3,4,9,10-perylenedicarboximide (cis and trans mixture) dye and the hole transporting agent 1,1-bis(di-p-tolylaminophenyl)cyclohexane. Next, a hole transporting layer of 0.5 $\mu$m in thickness was formed on the photoconductor layer by evaporating the hole transporting agent alone. Finally, a gold electrode was evaporated onto the hole transporting layer to complete the device.

The index of refraction of the optically active layer was a linear function of the potential gradient applied to it. Since the indices of refraction normal to and parallel to the plane of the optically active layer varied by different amounts, the application of a potential gradient produced birefringence in the film.

The second order polarization susceptibility, $\chi^{(2)}$, of the film was measured in the following manner: A 1.064 $\mu$m wavelength laser beam was passed through the device and reflected from the gold electrode at an angle of incidence of 68° (measured from an axis normal to the plane of the optically active layer). The beam was linearly polarized at an angle of 45° with respect to the plane of incidence. The voltage induced birefringence resulted in a relative shift $\Delta$ of the reflected radiation polarized in-the-plane and normal-to-the-plane of incidence. The phase shift was measured by passing the reflected light through a phase shifting waveplate and then a polarizer oriented at 90° with respect to the first polarizer. The intensity of light that passed through the second polarizer was related to $\Delta$ and therefore the voltage across the optically active layer. From the measured value of $\Delta$ with an ac voltage applied across the indium tin oxide and gold layers $\chi^{(2)}$ was determined to be approximately $2 \times 10^{-8}$ electrostatic units.

The device as operated by applying a $-200$ volts to the gold electrode and grounding the indium tin oxide layer. Under these conditions the dark current was low because the gold electrode could not inject electrons into the hole transporting layer. Hole injection into the optically active layer from the indium tin oxide layer was also low. The dark current was less than a few nanoamperes. When the device was flashed with a 514.5 nm writing beam, a photocurrent was observed. The photocurrent had a maximum value of 26 $\mu$A and duration of about 1 millisecond. The total current flow was about 20 nanocoulombs.

The writing beam information was read out of the device as follows: A read out infrared laser beam of 1.064 $\mu$m was passed directed to the device as shown in FIG. 1 with an angle of incidence of 68° and reflected from the gold electrode. The increase in conductance of the photoconductor layer produced by the writing beam resulted in a change in the intensity of the reflected 1.064 $\mu$m beam when directed at the area of the device addressed by the writing beam. The writing beam increased the voltage drop across the optically active layer by 50 volts in the area addressed by the writing beam. This changed the refractive index of the optically active layer in the addressed area which in turn produced a readily detectable (about 0.5 percent) change in intensity of the reflected read out beam.

The invention has been described in detail with particular reference to preferred embodiments thereof, but it will be understood that variations and modifications can be effected within the spirit and scope of the invention.

What is claimed is:

1. A combination capable of modulating electromagnetic radiation from a first source as a function of spatially intersecting electromagnetic radiation from a second source comprising first and second spaced electrodes, first intermediate means exhibiting a variance in its refractive index as a function of a potential gradient, and second intermediate means having a conductivity that varies as a function of exposure to the electromagnetic radiation from the second source, characterized in that said first intermediate means is a layer in contact with said first electrode having a second order polarization susceptibility of greater than $10^{-9}$ electrostatic units and is comprised of organic polar aligned noncentrosymmetric molecular dipoles each containing an electron donor moiety linked through a conjugated $\pi$ bonding system to an electron acceptor moiety, said second intermediate means is comprised of an electrophotographic photoreceptor layer unit interposed between said first intermediate means and said second electrode, and at least one of said first and second electrodes are transmissive to the electromagnetic radiation from the first source.

2. A combination capable of modulating electromagnetic radiation from a first source in response to modulation of spatially intersecting electromagnetic radiation from a second source comprising first and second electrical biasing means for establishing a potential gradient between first and second spaced locations and, interposed between said first and second electrical biasing means, first intermediate means exhibiting a variance in its refractive index as a function of a potential gradient, and second intermediate means having a conductivity that varies as a function of exposure to the electromagnetic radiation from the second source characterized in that said first and second electrical biasing means are comprised of first and second spaced electrodes, respectively, said first intermediate means is a first layer on said first electrode having a second order polarization susceptibility of greater than $10^{-9}$ electrostatic units and is comprised of organic polar aligned noncentrosymmetric molecular dipoles each containing an electron donor moiety linked through a conjugated $\pi$ bonding system to an electron acceptor moiety, said second intermediate means is comprised of an electrophotographic photoreceptor layer unit coated on said first layer, at least one of said first and second electrodes are transmissive to the electromagnetic radiation from the first source, and at least one of said first and second electrodes are transmissive to the electromagnetic radiation from the second source.

3. A combination according to either of claims 1 and 2 in which said electrophotographic photoreceptor layer unit is comprised of a charge generating layer and a charge transporting layer.

4. A combination according to claim 3 in which said electrophotographic photoreceptor layer unit is comprised of a sensitizer and an organic charge transporting agent.

5. A combination according to claim 3 in which said charge transporting layer is interposed between said charge generating layer and said second electrode.

6. A combination according to either of claims 1 and 2 in which said first electrode is transparent to radiation from both the first and second sources and said second electrode is capable of reflecting radiation from at least the first source.

7. A combination according to claim 6 further characterized in that said first electrode is comprised of a transparent metal oxide layer coated on a transparent dielectric support and said second electrode is a reflective metal layer coated on said electrophotographic photoreceptor layer unit.

8. A combination according to either of claims 1 and 2 in which said second electrode is transparent to radiation from the second source.

9. A combination capable of modulating electromagnetic radiation from a first source as a function of an image pattern of spatially intersecting X-radiation from a second source comprising first electrode and second spaced electrodes, a first intermediate means in contact with said first electrode comprised of a layer having a second order polarization susceptibility of greater than $10^{-9}$ electrostatic units comprised of organic polar aligned noncentrosymmetric molecular dipoles each containing an electron donor moiety linked through a conjugated $\pi$ bonding system to an electron acceptor moiety, a second intermediate means in contact with said second electrode comprised of a layer unit capable of conducting as a function of exposure to X-radiation, and said first electrode is transmissive to the electromagnetic radiation from the first source.

10. A combination according to any one of claims 1, 2 and 9 in which said organic molecular dipoles exhibit a second order polarizability of greater than $1 \times 10^{-30}$ electrostatic units.

11. A combination according to any one of claims 1, 2 and 9 in which said electron donor and electron acceptor moieties of said organic molecular dipoles are linked through a 4,4'-stilbene or diazostilbene conjugated $\pi$ bonding system.

12. A combination according to claim 11 in which said electron donor moiety is an amine.

13. A combination according to claim 11 further characterized in that said electron acceptor moiety is chosen from the class consisting of oxo, cyano, nitro and sulfonyl electron acceptor moieties.

14. A combination according to any one of claims 1, 2 and 9 in which said second intermediate means is comprised of an inorganic photoconductor.

15. A combination according to any one of claims 1, 2 and 9 additionally including means for optically coupling electromagnetic radiation from the first source to said first electrode and said first electrode is capable under at least one condition of operation of reflecting radiation from the first source.

16. A combination according to claim 15 further characterized in that said first electrode includes a metal layer having a thickness in the range of from 50 Å to 0.5 μm and said optical coupling means forms a support for said first electrode.

17. A combination according to claim 16 in which a dielectric layer having a thickness from 0.1 to 10 times the wavelength of the first radiation source and a refractive index which differs by less than 20 percent from that of said first layer of said first intermediate means is interposed between said metal layer and said optical coupling means.

18. A combination according to claim 17 in which said metal layer is comprised of a metal having a work function of at least 3.5 electron volts.

19. A combination according to claim 18 in which said metal layer is comprised of a metal having a work function of at least 4.5 electron volts.

20. A combination according to either of claims 1 or 9 in which said first electrode and said first intermediate means together form a readout element and said second electrode and said second intermediate means together form an electrophotographic plate.

21. A combination according to claim 20 additionally including means for optically coupling the first source of radiation to said readout element.

22. A combination according to claim 21 in which said readout element is comprised of said optical coupling means serving as a support, a dielectric layer having a thickness from 0.1 to 10 times the wavelength of the first radiation source coated on said support, a metal layer forming said first electrode consisting essentially of at least one metal having a work function of at least 3.5 eV, said metal layer having a thickness in the range of from 50 Å to 0.5 μm, and said first intermediate means consisting of said first layer having a second order polarization susceptibility of greater than $10^{-9}$ electrostatic units, and said dielectric layer and said first layer having refractive indices which differ by less than 20 percent.

23. A combination according to claim 22 in which said readout element additionally includes a mask having an aperture for restricting readout to a predetermined area.

24. A combination according to claim 20 in which said electrophotographic plate is comprised of said second electrode forming a support and said layer unit of said second intermediate means coated on said support.

25. A combination according to claim 24 in which said electrophotographic plate includes a dielectric barrier layer means for minimizing charge leakage from said layer unit to said second electrode prior to imagewise exposure of said electrophotographic plate.

26. A combination according to claim 25 in which said layer unit consists of an amorphous selenium layer coated on said dielectric barrier layer means.

27. A method for transferring information from one source of electromagnetic radiation to another comprising transferring information contained in a modulated source of electromagnetic radiation to an electrophotographic plate as a static charge image, and reading out the static charge image with a readout element which produces variances in intensity of reflected electromagnetic radiation from a readout source as a function of electrostatic charge variances in the electrophotographic plate, the electrophotographic plate and the readout element being constructed according to claim 20.

28. A process according to claim 27 further characterized in that the modulated source of electromagnetic radiation is X-radiation and an infrared laser is employed to provide electromagnetic readout radiation to be modulated.

29. A process of transferring information from one source of electromagnetic radiation to another comprising transferring information contained in a modulated source of electromagnetic radiation to a photorefractive imaging system and addressing the photorefractive imaging system with a source of electromagnetic radiation to be modulated in order to achieve information transfer from the modulated source of electromagnetic radiation to the source of radiation to be modulated, characterized in that the photorefractive imaging system is a combination according to any one of claims 1, 2 and 9.

30. A process according to claim 29 further characterized in that the modulated source of electromagnetic radiation is X-radiation and an infrared laser is employed to provide the source of electromagnetic radiation to be modulated.

* * * * *